US012650656B2

(12) United States Patent
Fukuma

(10) Patent No.: US 12,650,656 B2
(45) Date of Patent: Jun. 9, 2026

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventor: Michinori Fukuma, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 499 days.

(21) Appl. No.: 18/362,597

(22) Filed: Jul. 31, 2023

(65) Prior Publication Data

US 2024/0255860 A1 Aug. 1, 2024

(30) Foreign Application Priority Data

Jan. 23, 2023 (JP) ................................ 2023-008398

(51) Int. Cl.
*G03G 5/047* (2006.01)
*G03G 5/147* (2006.01)
*G03G 21/18* (2006.01)

(52) U.S. Cl.
CPC ......... *G03G 5/14704* (2013.01); *G03G 5/047* (2013.01); *G03G 21/1814* (2013.01)

(58) Field of Classification Search
CPC ... G03G 5/147; G03G 5/14704; G03G 5/0596
See application file for complete search history.

(56) References Cited

U.S. PATENT DOCUMENTS

2019/0302632 A1* 10/2019 Torigoe .................. G03G 5/147

FOREIGN PATENT DOCUMENTS

JP 2002-303994 A 10/2002
JP 2011-118308 A 6/2011
JP 2017-015861 * 1/2017 ............ G03G 5/047

OTHER PUBLICATIONS

Translation of JP 2017-015861.*

* cited by examiner

*Primary Examiner* — Peter L Vajda
(74) *Attorney, Agent, or Firm* — Sughrue Mion, PLLC

(57) ABSTRACT

An electrophotographic photoreceptor includes a conductive substrate, a charge generation layer disposed on the conductive substrate, a charge transport layer disposed on the charge generation layer, and an inorganic surface layer disposed on the charge transport layer, in which a capacitance of the charge transport layer per unit area is $1.5\times10^{-9}$ $F/m^2$ or greater and $3.8\times10^{-9}$ $F/m^2$ or less.

20 Claims, 2 Drawing Sheets

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2023-008398 filed Jan. 23, 2023.

BACKGROUND

(i) Technical Field

The present disclosure relates to an electrophotographic photoreceptor, a process cartridge, and an image forming apparatus.

(ii) Related Art

JP2002-303994A discloses an electrophotographic photoreceptor including a photosensitive layer that contains at least one of an organic charge generation material, an organic charge transport material, or an organic binder resin on a conductive substrate, in which in a case where the capacitance of the photosensitive layer is defined as C ($pF/cm^2$) and the film thickness thereof is defined as d (μm), the product of C and d is 3,100 or greater, and the film thickness of the photosensitive layer is 12 μm or greater and 18μ or less.

SUMMARY

Aspects of non-limiting embodiments of the present disclosure relate to an electrophotographic photoreceptor, a process cartridge, and an image forming apparatus that are unlikely to cause density unevenness in an image as compared with a case where the capacitance of a charge transport layer per unit area is less than $1.5\times10^{-9}$ $F/m^2$ or greater than $3.8\times10^{-9}$ $F/m^2$.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-described object includes the following aspects.

According to an aspect of the present disclosure, there is provided an electrophotographic photoreceptor including a conductive substrate, a charge generation layer disposed on the conductive substrate, a charge transport layer disposed on the charge generation layer, and an inorganic surface layer disposed on the charge transport layer, in which a capacitance of the charge transport layer per unit area is $1.5\times10^{-9}$ $F/m^2$ or greater and $3.8\times10^{-9}$ $F/m^2$ or less.

BRIEF DESCRIPTION OF THE DRAWINGS

Exemplary embodiment(s) of the present invention will be described in detail based on the following figures, wherein.

DETAILED DESCRIPTION

Figure 1:
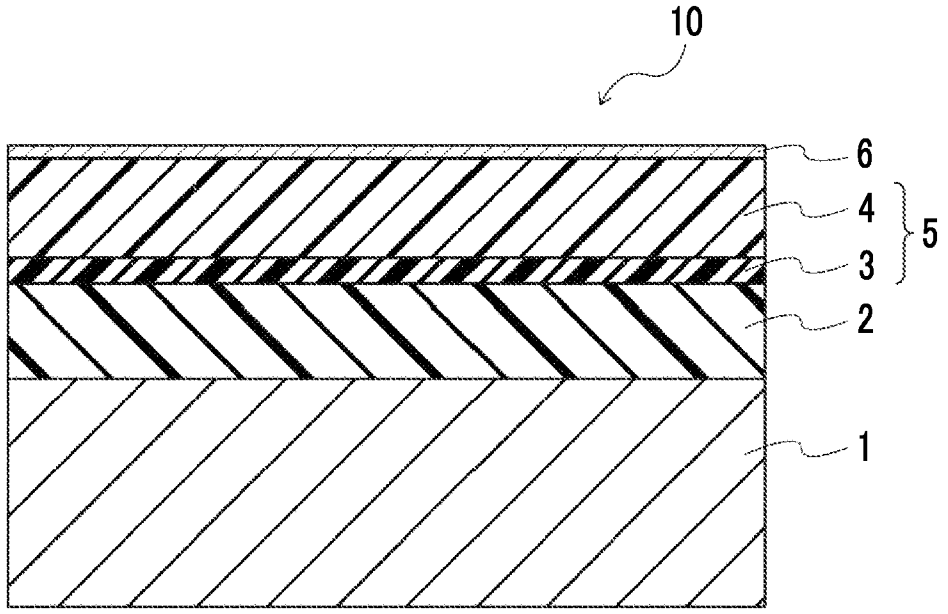
FIG. 1 is a partial cross-sectional view showing an example of a layer configuration of an electrophotographic photoreceptor according to the present exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present disclosure, an upper limit value or a lower limit value described in the numerical range may be replaced with a value shown in Examples.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual, and a relative relation in the sizes between the members is not limited thereto.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

Electrophotographic Photoreceptor

The electrophotographic photoreceptor of the present disclosure (hereinafter, also referred to as "photoreceptor") includes a conductive substrate, a charge generation layer disposed on the conductive substrate, a charge transport layer disposed on the charge generation layer, and an inorganic surface layer disposed on the charge transport layer.

FIG. 1 is a schematic cross-sectional view showing an example of the layer configuration of the photoreceptor according to the present disclosure. A photoreceptor 10 shown in FIG. 1 has a structure in which an undercoat layer 2, a charge generation layer 3, a charge transport layer 4, and an inorganic surface layer 6 are laminated in this order on a conductive substrate 1, and the charge generation layer 3 and the charge transport layer 4 constitute a photosensitive layer 5 (so-called function separation type photosensitive layer). The photoreceptor 10 may include an interlayer (not shown) between the undercoat layer 2 and the charge generation layer 3. The undercoat layer 2 may or may not be present.

In the photoreceptor of the present disclosure, the capacitance of the charge transport layer per unit area is $1.5\times10^{-9}$ F/m$^2$ or greater and $3.8\times10^{-9}$ F/m$^2$ or less.

In a photoreceptor including an inorganic surface layer (for example, a gallium oxide layer), the charge on the photoreceptor is likely to move to a carrier of a developer during development, potential unevenness occurs on the photoreceptor before and after the development, and thus density unevenness may occur in an image. On the contrary, in the photoreceptor of the present disclosure, it is assumed that the movement of the charge on the photoreceptor to a carrier of a developer during development is suppressed and the potential unevenness on the photoreceptor before and after the development is suppressed even in a case where the photoreceptor includes an inorganic surface layer by setting the capacitance of the charge transport layer per unit area to $1.5\times10^{-9}$ F/m$^2$ or greater and $3.8\times10^{-9}$ F/m$^2$ or less. Therefore, the photoreceptor of the present disclosure is unlikely to cause density unevenness in an image.

In a case where the capacitance of the charge transport layer per unit area is less than $1.5\times10^{-9}$ F/m$^2$, the charge on the photoreceptor moves to a carrier of a developer during development, and thus the surface potential of the photoreceptor is decreased and image dots are likely to fluctuate. From the viewpoint of suppressing this problem, the capacitance of the charge transport layer per unit area in the photoreceptor of the present disclosure is $1.5\times10^{-9}$ F/m$^2$ or greater, for example, preferably $1.7\times10^{-9}$ F/m$^2$ or greater, and more preferably $1.9\times10^{-9}$ F/m$^2$ or greater.

In a case where the capacitance of the charge transport layer per unit area is greater than $3.8\times10^{-9}$ F/m$^2$, charging failure is likely to occur. From the viewpoint of suppressing this problem, the capacitance of the charge transport layer per unit area in the photoreceptor of the present disclosure is $3.8\times10^{-9}$ F/m$^2$ or less, for example, preferably $3.0\times10^{-9}$ F/m$^2$ or less, more preferably $2.7\times10^{-9}$ F/m$^2$ or less, and still more preferably $2.1\times10^{-9}$ F/m$^2$ or less.

The following first and second exemplary embodiments may be described as the exemplary embodiment in which the capacitance of the charge transport layer per unit area is easily controlled to be in the above-described ranges.

In the first exemplary embodiment, the relative permittivity of the charge transport layer is 4 or greater and 7 or less. In a case where the relative permittivity of the charge transport layer is set to be in the above-described ranges, the capacitance of the charge transport layer per unit area is controlled to $1.5\times10^{-9}$ F/m$^2$ or greater and $3.8\times10^{-9}$ F/m$^2$ or less so that the occurrence of the density unevenness in an image is suppressed. From the viewpoint of further suppressing the density unevenness in an image, the relative permittivity of the charge transport layer is, for example, preferably 4 or greater and 7 or less and more preferably 5 or greater and 6 or less.

The relative permittivity of the charge transport layer can be controlled to be in a range of 4 or greater and 7 or less by allowing the charge transport layer to contain an appropriate amount of a high dielectric material (for example, metal titanate particles). The details will be described below.

In the second exemplary embodiment, the average thickness of the charge transport layer is 10 μm or greater and 20 μm or less. In a case where the average thickness of the charge transport layer is set to be in the above-described range, the capacitance of the charge transport layer per unit area is controlled to $1.5\times10^{-9}$ F/m$^2$ or greater and $3.8\times10^{-9}$ F/m$^2$ or less so that the occurrence of the density unevenness in an image is suppressed. From the viewpoint of further suppressing the density unevenness in an image, the average thickness of the charge transport layer is, for example, more preferably 12 μm or greater and 18 μm or less and still more preferably 14 μm or greater and 16 μm or less.

The average thickness of the charge transport layer in the first exemplary embodiment is not limited. The average thickness of the charge transport layer in the first exemplary embodiment is, for example, preferably 30 μm or greater and 34 μm or less, more preferably 31 μm or greater and 33 μm or less, and still more preferably 31.5 μm or greater and 32.5 μm or less.

The relative permittivity of the charge transport layer in the second exemplary embodiment is not limited. The relative permittivity of the charge transport layer in the second exemplary embodiment is, for example, preferably 2 or greater and 4 or less, more preferably 3 or greater and 3.5 or less, and still more preferably 3.1 or greater and 3.3 or less.

In the present disclosure, methods of measuring the capacitance of the charge transport layer per unit area and the relative permittivity of the charge transport layer according to the present disclosure are as follows.

The charge transport layer is peeled off from the photoreceptor and used as a sample. The sample is sandwiched in a sample holder of an impedance analyzer (Toyo Corporation) and measured at an AC voltage of 1 V and a frequency of 100 Hz, and the calculation is performed by CR parallel fitting.

The average thickness of each layer of the photoreceptor in the present disclosure is a value obtained by analyzing the layer thickness at 10 sites at equal intervals in an axial direction of the photoreceptor and at 40 sites in total at intervals of 90° in a circumferential direction using a reflection spectroscopic film thickness measuring device and arithmetically averaging the analyzed values.

Hereinafter, each layer of the photoreceptor according to the present exemplary embodiment will be described in detail.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $1\times10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. In a case where incoherent light is used as a light source, roughening of the surface to prevent interference fringes is not particularly necessary, and it is appropriate for longer life because occurrence of defects due to the unevenness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the fine pores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by immersing the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $1\times10^2$ (2 cm or greater and $1\times10^{11}$ (2 cm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater.

The volume average particle diameter of the inorganic particles may be, for example, 50 nm or greater and 2,000 nm or less (for example, preferably 60 nm or greater and 1,000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

Here, the undercoat layer may contain an electron-accepting compound (acceptor compound) together with the inorganic particles, for example, from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophene compound; a diphenoquinone compound such as 3,3',5,5'-tetra-t-butyldiphenoquinone; and a benzophenone compound.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

The electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The average thickness of the undercoat layer is set to, for example, preferably 15 μm or greater and more preferably in a range of 20 μm or greater and 50 μm or less.

Interlayer

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, an air knife coating method, and a curtain coating method.

The average thickness of the interlayer is set to be, for example, preferably in a range of 0.1 μm or greater and 3 μm or less. The interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is, for example, preferable in a case where an incoherent light source such as a light emitting diode (LED) or an organic electro-luminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer. The n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $10^{13}$ Ωcm or greater. These binder resins may be used alone or in the form of a mixture of two or more kinds thereof.

The blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. The charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a fine flow path in a high-pressure state. During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The average thickness of the charge generation layer is set to be, for example, preferably in a range of 0.1 μm or greater and 5.0 μm or less and more preferably in a range of 0.2 μm or greater and 2.0 μm or less.

Charge Transport Layer

The charge transport layer is, for example, a layer containing a charge transport material and a binder resin. The charge transport layer may be a layer containing a polymer charge transport material.

From the viewpoint of controlling the relative permittivity of the charge transport layer to 4 or greater, it is preferable that the charge transport layer contains, for example, at least one of barium titanate particles or strontium titanate particles. The relative permittivity of the charge transport layer can be set to 4 or greater, which is relatively high, by allowing the charge transport layer to contain such particles serving as a high dielectric material.

In a case where the charge transport layer contains barium titanate particles, from the viewpoint of controlling the relative permittivity of the charge transport layer to 4 or greater and 7 or less, the volume of the barium titanate particles in the total volume of the charge transport layer is, for example, preferably 0.02% by volume or greater and 0.09% by volume or less, more preferably 0.03% by volume or greater and 0.05% by volume or less, and still more preferably 0.035% by volume or greater and 0.045% by volume or less.

In a case where the charge transport layer contains strontium titanate particles, from the viewpoint of controlling the relative permittivity of the charge transport layer to 4 or greater and 7 or less, the volume of the strontium titanate particles in the total volume of the charge transport layer is, for example, preferably 0.3% by volume or greater and 1.5% by volume or less, more preferably 0.5% by volume or greater and 1.0% by volume or less, and still more preferably 0.6% by volume or greater and 0.7% by volume or less.

From the viewpoint of dispersing particles in the charge transport layer with high uniformity, the particle diameter of the barium titanate particles and the strontium titanate particles is, for example, preferably 10 nm or greater and 100 nm or less in terms of the average primary particle diameter.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

From the viewpoint of the charge mobility, for example, a triarylamine derivative represented by Structural Formula (a-1) or a benzidine derivative represented by Structural Formula (a-2) is preferable as the charge transport material.

(a-1)

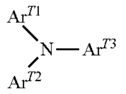

In Structural Formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

(a-2)

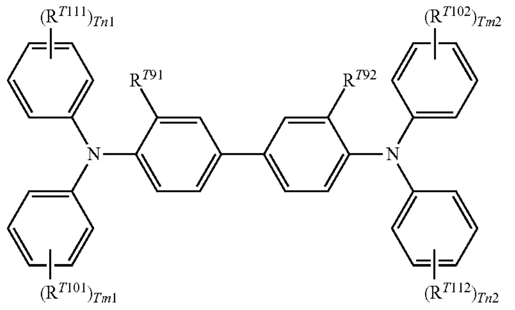

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, a substituted amino group substituted with an alkyl group having 1 or more and 2 or less carbon atoms, a substituted or unsubstituted aryl group, $-C(R^{T12})=C(R^{T13})(R^{T14})$, or $-CH=CH-CH=C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or greater and 2 or less.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "$-C_6H_4-CH=CH-CH=C(R^{T7})(R^{T8})$" and a benzidine derivative having "$-CH=CH-CH=C(R^{T15})(R^{T16})$" are particularly preferable from the viewpoint of the charge mobility.

As the polymer charge transport material, known materials having charge transport properties, such as poly-N-vinylcarbazole and polysilane, can be used. Particularly, for example, a polyester-based polymer charge transport material is particularly preferable. The polymer charge transport material may be used alone or in combination of binder resins.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among these, for example, a polycarbonate resin or a polyarylate resin is preferable as the binder resin. These binder resins may be used alone or in combination of two or more kinds thereof.

The blending ratio between the charge transport material and the binder resin is, for example, preferably 10:1 to 1:5 in terms of the mass ratio.

The charge transport layer may also contain other known additives.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

Inorganic Surface Layer

It is preferable that the inorganic surface layer is, for example, a metal oxide layer.

Examples of the metal oxide include gallium oxide, aluminum oxide, zinc oxide, titanium oxide, indium oxide, tin oxide, boron oxide, and mixed crystals thereof. The metal oxide contained in the inorganic surface layer may be used alone or in combination of two or more kinds thereof.

Examples of an exemplary embodiment of the inorganic surface layer include a gallium oxide layer.

In a case where the photoreceptor includes a gallium oxide layer as the inorganic surface layer, the density unevenness in an image is remarkably suppressed by the configuration of the present disclosure (that is, the capacitance of the charge transport layer per unit area is $1.5\times10^{-9}$ F/m$^2$ or greater and $3.8\times10^{-9}$ F/m$^2$ or less).

From the viewpoint of maintaining an electrostatic latent image, the volume resistivity of the inorganic surface layer is, for example, preferably $1.0\times10^{10}$ Ω·cm or greater and more preferably $1.0\times10^{11}$ Ω·cm or greater.

In the present disclosure, a method of measuring the volume resistivity of the inorganic surface layer is as follows.

The inorganic surface layer is peeled off from the photoreceptor and used as a sample. The sample is sandwiched in a sample holder of an impedance analyzer (Toyo Corporation), the resistance value is measured at an AC voltage of 1 V and a frequency of 100 Hz, and the calculation is performed based on the area of an electrode and the thickness of the sample.

Examples of a method of forming the inorganic surface layer include known vapor phase film deposition methods such as a plasma chemical vapor deposition (CVD) method, an organic metal vapor phase growth method, a molecular beam epitaxy method, a vapor deposition method, and a sputtering method. For example, the inorganic surface layer can be formed by applying the plasma CVD film deposition device and film deposition conditions described in JP2011-118308A.

The average thickness of the inorganic surface layer is, for example, preferably 2 μm or greater and 10 μm or less and more preferably 4 μm or greater and 8 μm or less.

Process Cartridge and Image Forming Apparatus

An image forming apparatus according to the present exemplary embodiment includes the electrophotographic photoreceptor, a charging unit that charges a surface of the electrophotographic photoreceptor, an electrostatic latent image forming unit that forms an electrostatic latent image on the charged surface of the electrophotographic photoreceptor, a developing unit that develops the electrostatic latent image formed on the surface of the electrophotographic photoreceptor with a developer containing a toner to form a toner image, and a transfer unit that transfers the toner image to a surface of a recording medium. Further, the electrophotographic photoreceptor according to the present exemplary embodiment is employed as the electrophotographic photoreceptor.

As the image forming apparatus according to the present exemplary embodiment, known image forming apparatuses such as an apparatus including a fixing unit that fixes a toner image transferred to the surface of a recording medium; a direct transfer type apparatus that transfers a toner image formed on the surface of an electrophotographic photoreceptor directly to a recording medium; an intermediate transfer type apparatus that primarily transfers a toner image formed on the surface of an electrophotographic photoreceptor to the surface of an intermediate transfer member and secondarily transfers the toner image transferred to the surface of the intermediate transfer member to the surface of a recording medium; an apparatus including a cleaning unit that cleans the surface of an electrophotographic photoreceptor after the transfer of a toner image and before the charging; an apparatus including a charge erasing unit that erases the charges on the surface of the electrophotographic photoreceptor by applying the charge erasing light after the transfer of a toner image and before the charging; and an apparatus including an electrophotographic photoreceptor heating member for increasing the temperature of an electrophotographic photoreceptor and decreasing the relative temperature are employed.

In a case of the intermediate transfer type apparatus, the transfer unit is, for example, configured to include an intermediate transfer member having a surface onto which the toner image is transferred, a primary transfer unit primarily transferring the toner image formed on the surface of the electrophotographic photoreceptor to the surface of the intermediate transfer member, and a secondary transfer unit secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

In the image forming apparatus according to the present exemplary embodiment, for example, the portion including the electrophotographic photoreceptor may have a cartridge structure (process cartridge) that is attachable to and detachable from the image forming apparatus. As the process cartridge, for example, a process cartridge including the electrophotographic photoreceptor according to the present exemplary embodiment is preferably used. The process cartridge may include, for example, at least one selected from the group consisting of a charging unit, an electrostatic latent image forming unit, a developing unit, and a transfer unit in addition to the electrophotographic photoreceptor.

Hereinafter, an example of the image forming apparatus according to the present exemplary embodiment will be described, but the present exemplary embodiment is not limited thereto. Further, main parts shown in the figures will be described, but description of other parts will not be provided.

Figure 2:
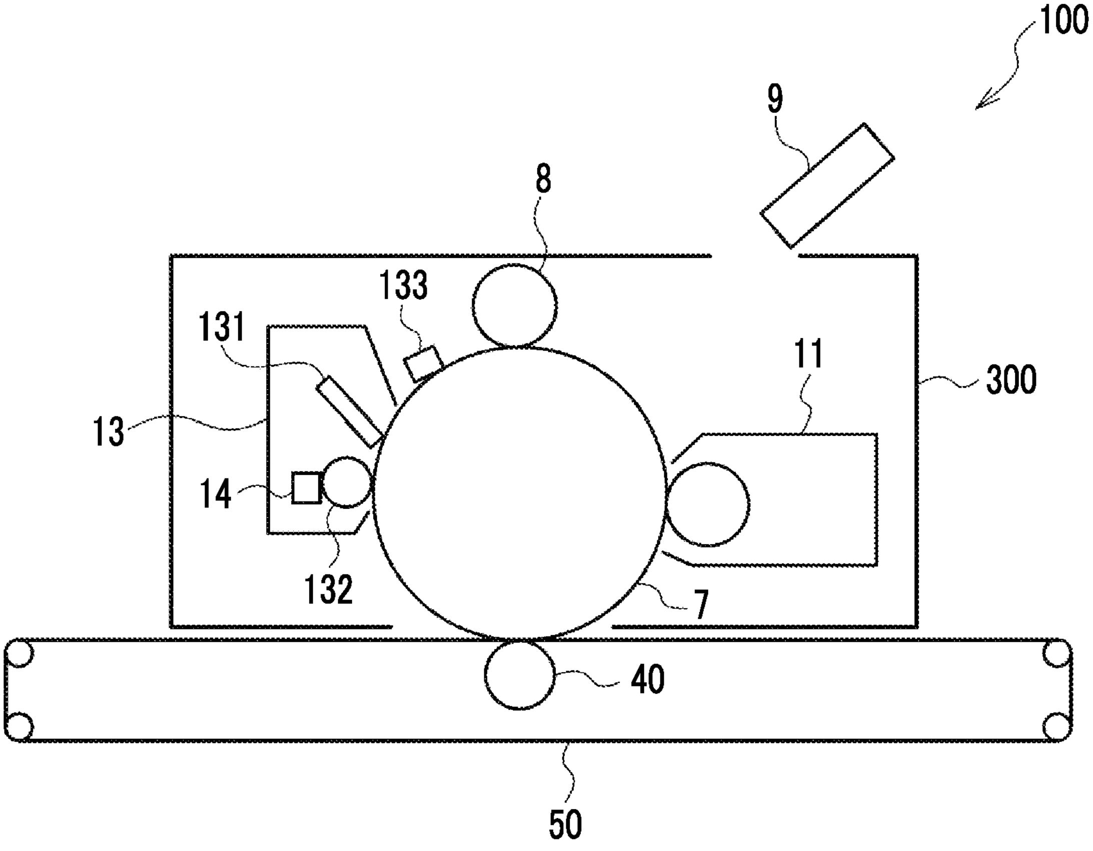
FIG. 2 is a schematic configuration view showing an example of an image forming apparatus according to the present exemplary embodiment.

FIG. 2 is a schematic configuration view showing an example of the image forming apparatus according to the present exemplary embodiment.

As shown in FIG. 2, an image forming apparatus 100 according to the present exemplary embodiment includes a process cartridge 300 including an electrophotographic photoreceptor 7, an exposure device 9 (an example of an electrostatic latent image forming unit), a transfer device 40 (primary transfer unit), and an intermediate transfer member 50. In the image forming apparatus 100, the exposure device 9 is disposed at a position that can be exposed to the electrophotographic photoreceptor 7 from an opening portion of the process cartridge 300, the transfer device 40 is disposed at a position that faces the electrophotographic photoreceptor 7 via the intermediate transfer member 50, and the intermediate transfer member 50 is disposed such that a part of the intermediate transfer member 50 is in contact with the electrophotographic photoreceptor 7. Although not shown, the image forming apparatus also includes a secondary transfer unit that transfers the toner image transferred to the intermediate transfer member 50 to a recording medium (for example, paper). The intermediate transfer member 50, the transfer device 40 (primary transfer unit), and the secondary transfer device (not shown) correspond to an example of the transfer unit.

The process cartridge 300 in FIG. 2 integrally supports the electrophotographic photoreceptor 7, a charging device 8 (an example of the charging unit), a developing device 11 (an example of the developing unit), and a cleaning device 13 (an example of the cleaning unit) in a housing. The cleaning device 13 has a cleaning blade (an example of the cleaning member) 131, and the cleaning blade 131 is disposed to come into contact with the surface of the electrophotographic photoreceptor 7. The cleaning member may be a conductive or insulating fibrous member instead of the aspect of the cleaning blade 131, and may be used alone or in combination with the cleaning blade 131.

FIG. 2 shows an example of an image forming apparatus including a fibrous member 132 (roll shape) that supplies a lubricant 14 to the surface of the electrophotographic photoreceptor 7 and a fibrous member 133 (flat brush shape) that assists cleaning, but these are disposed as necessary.

Hereinafter, each configuration of the image forming apparatus according to the present exemplary embodiment will be described.

Charging Device

As the charging device 8, for example, a contact-type charger formed of a conductive or semi-conductive charging roller, a charging brush, a charging film, a charging rubber blade, a charging tube, or the like is used. Further, a known charger such as a non-contact type roller charger, or a scorotron charger or a corotron charger using corona discharge is also used.

Exposure Device

Examples of the exposure device 9 include an optical system device that exposes the surface of the electrophotographic photoreceptor 7 to light such as a semiconductor laser beam, LED light, and liquid crystal shutter light in a predetermined image pattern. The wavelength of the light source is within the spectral sensitivity region of the electrophotographic photoreceptor. As the wavelength of a semiconductor laser, near infrared, which has an oscillation wavelength in the vicinity of 780 nm, is mostly used. However, the wavelength is not limited thereto, and a laser having an oscillation wavelength of approximately 600 nm or a laser having an oscillation wavelength of 400 nm or greater and 450 nm or less as a blue laser may also be used. Further, a surface emission type laser light source capable of outputting a multi-beam is also effective for forming a color image.

Developing Device

Examples of the developing device 11 include a typical developing device that performs development in contact or non-contact with the developer. The developing device 11 is not particularly limited as long as the developing device has the above-described functions, and is selected depending on the purpose thereof. Examples of the developing device include known developing machines having a function of attaching a one-component developer or a two-component developer to the electrophotographic photoreceptor 7 using a brush, a roller, or the like. Among these, for example, a developing device formed of a developing roller having a surface on which a developer is held is preferably used.

The developer used in the developing device 11 may be a one-component developer containing only a toner or a two-component developer containing a toner and a carrier. Further, the developer may be magnetic or non-magnetic. Known developers are employed as these developers.

Cleaning Device

As the cleaning device 13, a cleaning blade type device including the cleaning blade 131 is used. In addition to the cleaning blade type device, a fur brush cleaning type device or a simultaneous development cleaning type device may be employed.

Transfer Device

Examples of the transfer device 40 include a known transfer charger such as a contact-type transfer charger using a belt, a roller, a film, or a rubber blade, a scorotron transfer charger, or a corotron transfer charger using corona discharge.

Intermediate Transfer Member

As the intermediate transfer member 50, a belt-like intermediate transfer member (intermediate transfer belt) containing semi-conductive polyimide, polyamide-imide, polycarbonate, polyarylate, polyester, rubber, or the like is used. Further, as the form of the intermediate transfer member, a drum-like intermediate transfer member may be used in addition to the belt-like intermediate transfer member.

Figure 3:
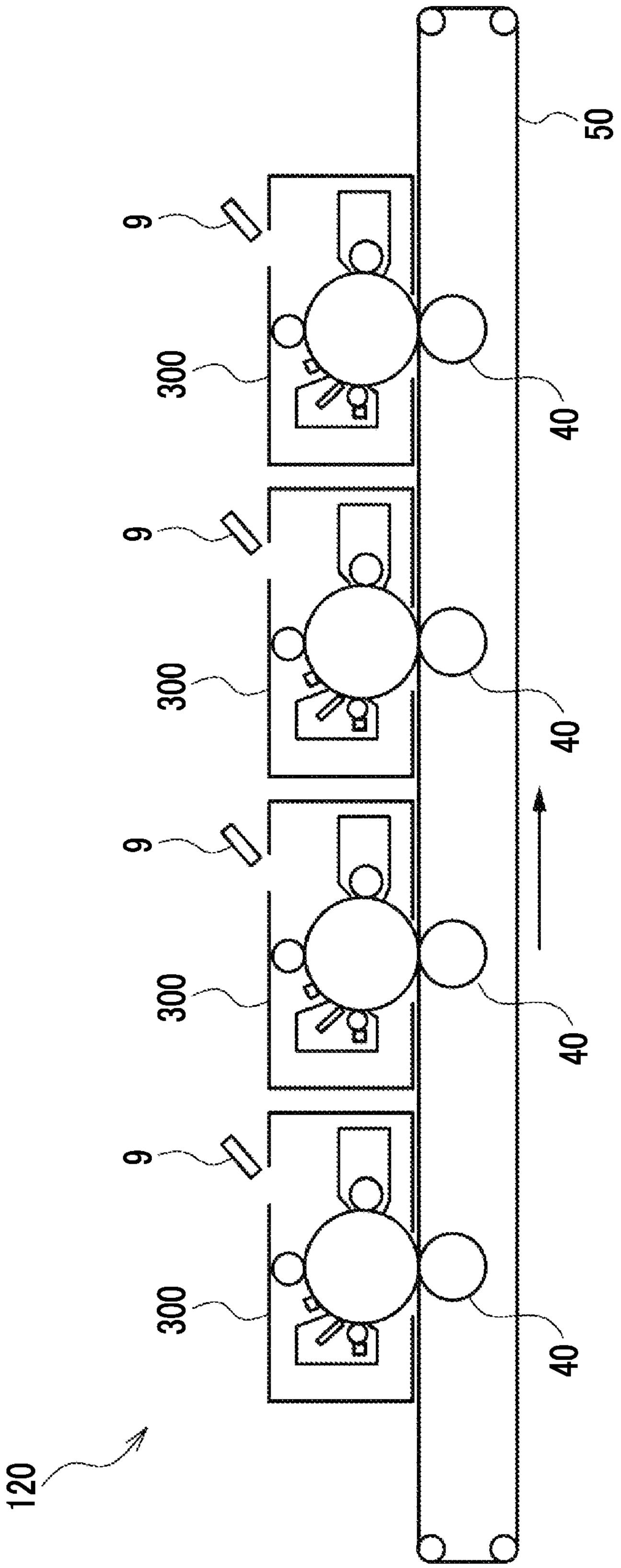
FIG. 3 is a schematic configuration view showing another example of the image forming apparatus according to the present exemplary embodiment.

FIG. 3 is a schematic configuration view showing another example of the image forming apparatus according to the present exemplary embodiment.

An image forming apparatus 120 shown in FIG. 3 is a tandem type multicolor image forming apparatus on which four process cartridges 300 are mounted. The image forming apparatus 120 is formed such that four process cartridges 300 are arranged in parallel on the intermediate transfer member 50, and one electrophotographic photoreceptor is used for each color. The image forming apparatus 120 has the same configuration as the image forming apparatus 100 except that the image forming apparatus 120 is of a tandem type.

EXAMPLES

Hereinafter, the photoreceptor of the present disclosure will be described in detail with reference to examples, but the photoreceptor of the present disclosure is not limited to these examples.

In the following description, the preparation, the treatment, the production, and the like are carried out at room temperature (25° C.±3° C.) unless otherwise specified.

Production of Photoreceptor

Example 1

Formation of Undercoat Layer

An aluminum cylindrical tube having an outer diameter of 60 mm, a length of 360 mm, and a thickness of 1 mm is prepared as a conductive substrate.

100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using glass beads with a diameter of 1 mmφ, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170° C. for 40 minutes to form an undercoat layer. The average thickness of the undercoat layer is 25 μm.

Formation of Charge Generation Layer

A mixture of 15 parts of hydroxygallium phthalocyanine as a charge generation substance (Bragg angle (2θ±0.2°) of the X-ray diffraction spectrum using Cuka characteristic X-ray has diffraction peaks at positions at least of 7.5°, 9.9°, 12.5, 16.3°, 18.6°, 25.1°, and) 28.3°, 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads having a diameter of 1 mm. 175 parts of n-butyl acetate and 180 parts of methyl ethyl ketone are added to the dispersion liquid and dispersed in a sand mill, thereby obtaining a coating solution for forming a charge generation layer. The undercoat layer is immersed in and coated with the coating solution for forming a charge generation layer and dried at room temperature (25° C.±3° C.) to form a charge generation layer having an average thickness of 0.2 μm.

Formation of Charge Transport Layer 60 parts of a bisphenol Z-type polycarbonate resin (homopolymer of bisphenol Z, viscosity average molecular weight of 40,000) and 40 parts of a charge transport material CTM-1 are dissolved in 270 parts of tetrahydrofuran and 30 parts of toluene. Strontium titanate particles (average primary particle diameter of 80 nm) are added to this solution in an amount such that the volume proportion in the total solid content reaches the proportion listed in Table 1, and the mixture is dispersed in a sand mill for 2 hours, thereby obtaining a coating solution for forming a charge transport layer. The charge generation layer is immersed in and coated with the coating solution for forming a charge transport layer, and dried at 145° C. for 30 minutes to form a charge transport layer. The average thickness of the charge transport layer is 32 μm.

CTM-1

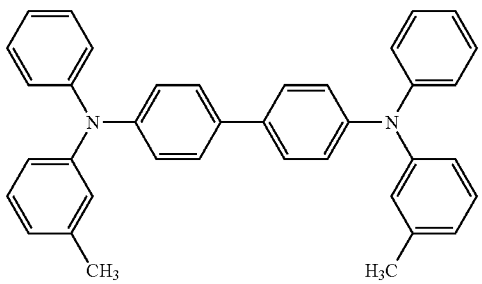

Formation of Inorganic Surface Layer

A gallium oxide layer is formed by plasma CVD. The average thickness of the inorganic surface layer is 6 μm. The element composition ratio (O/Ga) of oxygen to gallium in the inorganic surface layer is 3. The volume resistivity of the inorganic surface layer is $5.0\times10^{11}$ Ω·cm.

Examples 2 and 3 and Comparative Examples 1 and 2

Each photoreceptor is produced in the same manner as in Example 1 except that the content of the strontium titanate particles used for forming the charge transport layer is changed as listed in Table 1.

Examples 4 to 6 and Comparative Example 3

Each photoreceptor is produced in the same manner as in Example 1 except that the strontium titanate particles used for forming the charge transport layer are changed to barium titanate particles (average primary particle diameter of 50 nm) and the content thereof is prepared as listed in Table 1.

Examples 7 to 9 and Comparative Examples 4 and 5

Each photoreceptor is produced in the same manner as in Example 1 except that the strontium titanate particles are not used for forming the charge transport layer and the average thickness of the charge transport layer is changed as listed in Table 1.

Performance Evaluation of Photoreceptor

Charging Stability of Photoreceptor

The photoreceptor of each example and each comparative example is attached to an image forming apparatus (DocuCentre-V C7775, manufactured by FUJIFILM Business Innovation Corp.). The potential decay of the photoreceptor after charging is monitored at two sites at equal intervals in the axial direction of the photoreceptor, and the results are classified as follows. The results are listed in Table 1.

A: A variation is not observed in charging.

B: A slight variation is observed in charging.

C: A variation is observed in charging.

D: A variation is observed in charging, and the fluctuation is large.

The photoreceptors in which the evaluation result of the charging stability is "D" are not possible to undergo evaluation for dots in the evaluation of "density unevenness in image" described below, and thus "–" is listed in the columns of "density unevenness in image" of Table 1.

Density Unevenness of Image

The photoreceptor of each example and each comparative example is attached to an image forming apparatus (DocuCentre-V C7775, manufactured by FUJIFILM Business Innovation Corp.). The photoreceptor is attached such that a nip width between the photoreceptor and the intermediate transfer belt is 4 mm.

7500 sheets of halftone images with a density of 50% are continuously output onto A3 size plain paper in an environment of a temperature of 28° C. and a relative humidity of 85%. The dot shape of the image on the final one sheet is observed with a loupe, and the result is classified as follows. The results are listed in Table 1.

A: A variation is not observed in the size of dots.

B: A slight variation is observed in the size of dots.

C: A variation is observed in the size of dots.

D: A variation is observed in the size of dots, and the fluctuation in the size of dots is large.

TABLE 1

| | | Charge transport layer | | | | | Performance evaluation | |
|---|---|---|---|---|---|---|---|---|
| | | Particles | | | | | | |
| | | Type — | Content % by volume | Capacitance $\times 10^{-9}$ F/m$^2$ | Relative permittivity — | Average thickness μm | Charging stability of photoreceptor | Density unevenness in image |
| First exemplary embodiment | Comparative Example 1 | — | 0 | 1.2 | 3 | 32 | A | D |
| | Example 1 | Strontium titanate | 0.32 | 1.5 | 4 | 32 | A | B |
| | Example 2 | Strontium titanate | 0.65 | 1.9 | 5 | 32 | A | A |
| | Example 3 | Strontium titanate | 1.50 | 1.5 | 4 | 32 | B | A |
| | Comparative Example 2 | Strontium titanate | 2.28 | 3.9 | 10 | 32 | D | — |
| | Example 4 | Barium titanate | 0.02 | 1.5 | 4 | 32 | A | B |
| | Example 5 | Barium titanate | 0.04 | 1.9 | 5 | 32 | A | A |
| | Example 6 | Barium titanate | 0.09 | 2.7 | 7 | 32 | B | A |
| | Comparative Example 3 | Barium titanate | 0.15 | 3.9 | 10 | 32 | D | — |
| Second exemplary embodiment | Comparative Example 4 | — | 0 | 1.4 | 3 | 25 | A | D |
| | Example 7 | — | 0 | 1.9 | 3 | 20 | A | C |
| | Example 8 | — | 0 | 2.5 | 3 | 15 | B | C |
| | Example 9 | — | 0 | 3.7 | 3 | 10 | B | C |
| | Comparative Example 5 | — | 0 | 4.6 | 3 | 8 | D | — |

The electrophotographic photoreceptor, the process cartridge, and the image forming apparatus of the present disclosure include the following aspects.

(((1)))

An electrophotographic photoreceptor comprising:

a conductive substrate;

a charge generation layer disposed on the conductive substrate;

a charge transport layer disposed on the charge generation layer; and an inorganic surface layer disposed on the charge transport layer, wherein a capacitance of the charge transport layer per unit area is $1.5\times10^{-9}$ F/m$^2$ or greater and $3.8\times10^{-9}$ F/m$^2$ or less.

(((2)))

The electrophotographic photoreceptor according to (((1))), wherein the charge transport layer has a relative permittivity of 4 or greater and 7 or less (((3)))

The electrophotographic photoreceptor according to (((1))), wherein the charge transport layer has an average thickness of 10 μm or greater and 20 μm or less.

(((4)))

The electrophotographic photoreceptor according to (((2))), wherein the charge transport layer contains at least one of barium titanate particles or strontium titanate particles.

(((5)

The electrophotographic photoreceptor according to (((2))) or (((4)

wherein the charge transport layer contains barium titanate particles, and a volume of the barium titanate particles in a total volume of the charge transport layer is 0.02% by volume or greater and 0.09% by volume or less.

(((6)))

The electrophotographic photoreceptor according to (((2))) or (((4))), wherein the charge transport layer contains strontium titanate particles, and a volume of the strontium titanate particles in a total volume of the charge transport layer is 0.3% by volume or greater and 1.5% by volume or less.

(((7)))

The electrophotographic photoreceptor according to any one of (((1))) to (((6))), wherein the inorganic surface layer has a volume resistivity of $1.0\times10^{10}$ Ω·cm or greater.

(((8)))

The electrophotographic photoreceptor according to any one of (((1))) to (((7))), wherein the inorganic surface layer has a volume resistivity of $1.0\times10^{11}$ Ω·cm or greater.

(((9)))

The electrophotographic photoreceptor according to any one of (((1))) to (((8))), wherein the inorganic surface layer is a gallium oxide layer.

(((10)))

A process cartridge comprising:

the electrophotographic photoreceptor according to any one of (((1))) to (((9))), wherein the process cartridge is attachable to and detachable from an image forming apparatus.

(((11)))

An image forming apparatus comprising:

the electrophotographic photoreceptor according to any one of (((1))) to (((9)));

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:

a conductive substrate;

a charge generation layer disposed on the conductive substrate;

a charge transport layer disposed on the charge generation layer; and an inorganic surface layer disposed on the charge transport layer, wherein a capacitance of the charge transport layer per unit area is $1.5\times10^{-9}$ F/m$^2$ or greater and $3.8\times10^{-9}$ F/m$^2$ or less.

2. The electrophotographic photoreceptor according to claim 1, wherein the charge transport layer has a relative permittivity of 4 or greater and 7 or less.

3. The electrophotographic photoreceptor according to claim 1, wherein the charge transport layer has an average thickness of 10 μm or greater and 20 μm or less.

4. The electrophotographic photoreceptor according to claim 2, wherein the charge transport layer contains at least one of barium titanate particles or strontium titanate particles.

5. The electrophotographic photoreceptor according to claim 4, wherein the charge transport layer contains barium titanate particles, and a volume of the barium titanate particles in a total volume of the charge transport layer is 0.02% by volume or greater and 0.09% by volume or less.

6. The electrophotographic photoreceptor according to claim 4, wherein the charge transport layer contains strontium titanate particles, and a volume of the strontium titanate particles in a total volume of the charge transport layer is 0.3% by volume or greater and 1.5% by volume or less.

7. The electrophotographic photoreceptor according to claim 1, wherein the inorganic surface layer has a volume resistivity of $1.0\times10^{10}$ Ω·cm or greater.

8. The electrophotographic photoreceptor according to claim 7, wherein the inorganic surface layer has a volume resistivity of $1.0\times10^{11}$ Ω·cm or greater.

9. The electrophotographic photoreceptor according to claim 1, wherein the inorganic surface layer is a gallium oxide layer.

10. A process cartridge comprising:

the electrophotographic photoreceptor according to claim 1, wherein the process cartridge is attachable to and detachable from an image forming apparatus.

11. A process cartridge comprising:

the electrophotographic photoreceptor according to claim 2, wherein the process cartridge is attachable to and detachable from an image forming apparatus.

12. A process cartridge comprising:

the electrophotographic photoreceptor according to claim 3, wherein the process cartridge is attachable to and detachable from an image forming apparatus.

13. A process cartridge comprising:

the electrophotographic photoreceptor according to claim 4, wherein the process cartridge is attachable to and detachable from an image forming apparatus.

14. A process cartridge comprising:

the electrophotographic photoreceptor according to claim 5, wherein the process cartridge is attachable to and detachable from an image forming apparatus.

15. A process cartridge comprising:

the electrophotographic photoreceptor according to claim 6, wherein the process cartridge is attachable to and detachable from an image forming apparatus.

16. A process cartridge comprising:

the electrophotographic photoreceptor according to claim 7, wherein the process cartridge is attachable to and detachable from an image forming apparatus.

17. A process cartridge comprising:

the electrophotographic photoreceptor according to claim 8, wherein the process cartridge is attachable to and detachable from an image forming apparatus.

18. A process cartridge comprising:

the electrophotographic photoreceptor according to claim 9, wherein the process cartridge is attachable to and detachable from an image forming apparatus.

19. An image forming apparatus comprising:

the electrophotographic photoreceptor according to claim 1;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

20. An image forming apparatus comprising:

the electrophotographic photoreceptor according to claim 2;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

* * * * *